Dec. 26, 1933.        C. G. OLSON        1,940,878
SET SCREW
Filed Dec. 5, 1930

Inventor:
Carl G. Olson
By Chewey Cox & Moore
Attys.

Patented Dec. 26, 1933

1,940,878

UNITED STATES PATENT OFFICE 1,940,878

SET SCREW

Carl G. Olson, Chicago, Ill., assignor to Shakeproof Lock Washer Company, Chicago, Ill., a corporation of Delaware Application December 5, 1930. Serial No. 500,167

8 Claims. (Cl. 151—14)

My invention relates generally to self-locking screws and particularly to devices of the self-locking set screw type.

Set screws of the self-locking type have been employed heretofore. Certain of these known types of set screws include a bifurcated threaded body, in which the outer portions of the bifurcations occupy a normal deflected position, so that when the screw is inserted within a threaded aperture, said bifurcated sections or portions will resiliently bear against the threads in the work piece and thereby prevent the inadvertent removal of the screw. In all of these types of set screws with which I am familiar, the solid or unbifurcated portion of the screw does not contribute toward the resiliency of the bifurcated sections. In other words, this unbifurcated portion of the screw presents a solid mass which is not resilient, the only resiliency in the screw being present at the lower portions of the threaded sections which join the solid section. In view of the foregoing, it has heretofore been impractical to employ this bifurcated self-locking screw device for relatively short set screws.

It is one of the primary objects of my present invention to provide a bifurcated screw which is of such a construction that a relatively short screw will function as a self-locking screw with the same effectiveness as a longer screw.

More specifically, my invention contemplates the provision of a self-locking screw of the bifurcated type set forth above, in which the solid portion which joins the bifurcated sections is sufficiently resilient to materially contribute to the self-locking effectiveness of the screw.

Still more specifically, my invention contemplates the provision of a bifurcated screw, in which the portion connecting the bifurcated sections is resilient throughout substantially its entire length, or, in other words, from the point where it joins one of the bifurcations to the point where it joins the other bifurcation.

The foregoing and other objects and advantages will be more apparent from the following detailed description when considered in connection with the accompanying drawing, wherein—

Figure 1:
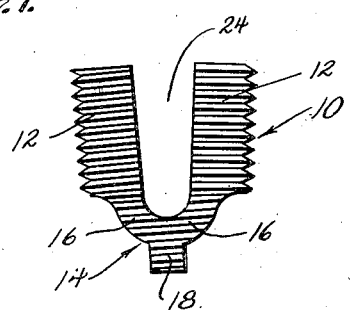
Figure 1 is a side elevational view of a set screw which is representative of one embodiment of my invention.
Figure 2:
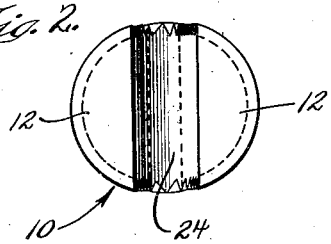
Figure 2 is a plan view of the screw shown in Figure 1.
Figure 3:
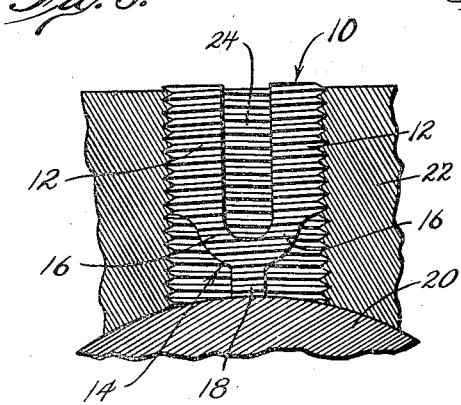
Figure 4:
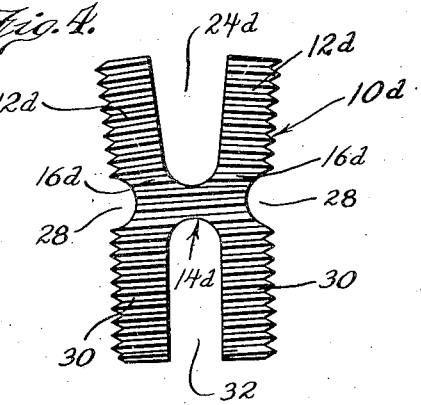
Figure 5:
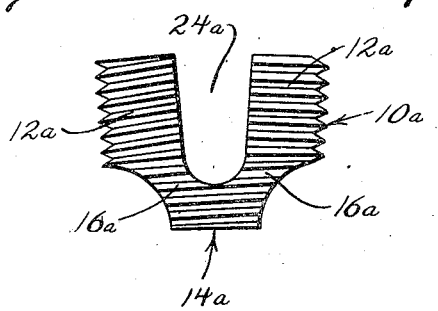

Figure 3 discloses the set screw of Figures 1 and 2 mounted within a work piece;

Figure 4 is a modified construction disclosing the manner in which a relatively long screw of the self-locking type may be constructed in accordance with the teachings of my present invention;

Figure 5 is a side elevational view of another modified construction; and

Figure 6:
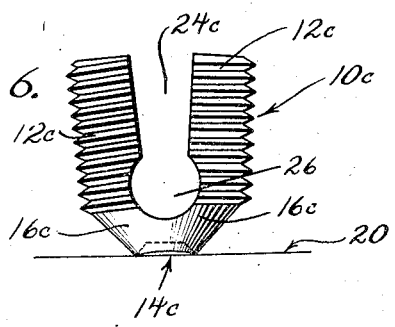

Figure 6 discloses a still further alternative form which embodies my invention.

Referring now to the drawing more in detail wherein like numerals have been employed to designate similar parts throughout the various figures, it will be seen that in Figures 1 to 3 inclusive I have disclosed a set screw designated generally by the numeral 10. This set screw comprises bifurcated threaded sections 12 which are joined by a connecting section 14. This connecting section 14 includes a pair of arcuate resilient portions 16 and a section 18 intermediate thereof, which is adapted to be tightened against a work piece 20, Figure 3, when the screw is mounted within a member 22. A central transverse recess 24 is presented between the threaded sections 12, and it will be apparent that the outer extremities of the sections 12 are sprung outwardly from a central plane of the screw so that when the screw is tightened within the work piece, as shown in Figure 3, these threaded sections 12 will resiliently bear against the companion threads of the work piece, and thereby frictionally oppose any tendency to loosen the screw.

Particular attention is directed to the manner in which the connecting section 14 is formed. It will be noted that this connecting section 14 is resilient over substantially its entire length, namely, over the length which comprises the arcuate portions 16, and hence it may be stated that the section 14 which connects the bifurcations or threaded sections 12, greatly facilitates the ease with which the threaded sections 12 may be deflected outwardly, as shown in Figure 1. By reason of this construction, the screw 10 may be made relatively short as compared with set screws of the bifurcated type which have been employed heretofore. In these conventional types of bifurcated set screws, all the resiliency which enabled the deflecting of the threaded section, was presented only at the point where the threaded sections join the connecting section. This conventional construction is to be clearly distinguished from my improved device, wherein the connecting section is inherently resilient, and hence materially contributes to the ease with which the bifurcations or threaded sections may be deflected. This resilient feature of the connecting section is particularly advantageous in instances where the set screw is of relatively large diameter, or where the screw is comparatively short.

In Figure 5, I have shown an alternative set screw which is designated generally by the numeral 10a, and it will be seen that this set screw includes bifurcated or threaded sections 12a, and a connecting section 14a, which includes a pair of resilient portions 16a. This set screw 10a is relatively short in length as compared with the diameter, and by removing a portion of the stock on each side of the screw adjacent the bottom of the transverse recess 24a, I present the resilient portions or members 16a. As stated above in connection with the device shown in Figure 1, such a construction enables the connecting section 14a to be resilient throughout substantially its entire length, and thereby greatly facilitates the deflecting of the threaded sections 12a, which deflection renders the screw self-locking.

In Figure 6, I have disclosed a still further alternative or modified form which I have designated generally by the numeral 10c. Portions of the screw 10c which correspond with the screws shown in Figures 1 and 5 have been designated by corresponding numerals bearing the letter c. In this screw 10c it will be observed that I provide at the lower portion of the transverse recess 24c an enlarged opening 26 which co-operates to render the connecting section 14c more resilient. In fact, by employing this construction, the entire length of the connecting section 14c is rendered resilient. It might be stated that the connecting section 14c has the same degree of resiliency throughout substantially its entire length, due to the fact that said section is substantially equal in thickness throughout its length.

In Figure 4, I have disclosed a set screw designated generally by the numeral 10d, and this screw is longer than the screws which have been described thus far. It will be seen that this screw 10d includes a central transverse recess 24d which separates threaded sections 12d. I provide recesses 28 on opposite sides of the screw body so as to present oppositely disposed resilient sections or members 16d, which comprise a connecting section designated generally by the numeral 14d. Extending downwardly from this connecting section 14d is a pair of threaded sections 30 which are separated by a suitable transverse recess 32. This recess 32 also cooperates in rendering the connecting section 14d resilient. The threaded sections 12d are deflected so that, when the screw is secured within the work piece, said section will automatically bear against the threads thereof with sufficient force to counteract any tendency to loosen the screw.

From the foregoing it will be apparent that my invention contemplates the provision of screws or set screws of the bifurcated type, in which the connecting section extending between the bifurcations is resilient throughout substantially its entire length. By this construction I am able to provide self-locking screws which are relatively short as compared with their diameters. Screws of this type have a very wide range of practical application in various fields of industrial activity, for example, in connection with electrical fixtures and the like.

While I have disclosed specific embodiments of the invention in the drawing, it will be clear that said invention is capable of numerous other modifications of structural design without departing from the spirit and scope thereof.

Having thus described my invention, what I claim as new and desire to secure by Letters Patent is:

1. A self-locking screw including a bifurcated threaded body presenting two screw elements, and a connecting section joining said screw elements at one extremity of said elements, said connecting section being resilient, whereby to facilitate the outward flexing of said screw elements.

2. A self-locking screw including a bifurcated threaded body presenting two screw elements, and a resilient connecting section joining said screw elements, said connecting section being arcuately formed on at least one side thereof, whereby to facilitate the outward flexing of said screw elements.

3. A self-locking screw having a transverse slot opening into an enlarged transverse aperture, the stock surrounding said enlarged aperture presenting a resilient connection, whereby to facilitate the outward flexing of the threaded sections positioned on opposite sides of the slot.

4. A self-locking screw including a screw body having a transverse slot to present oppositely disposed threaded sections, the portion of the stock surrounding the bottom of the slot presenting a connection for said threaded sections, the external surface of said connecting section being configurated to render the same resilient and thereby facilitate the outward flexing of said threaded sections to render the screw self-locking.

5. A self-locking screw including a screw body having a transverse slot to present oppositely disposed threaded sections, the portion of the stock surrounding the bottom of the slot presenting a connection for said threaded sections, a portion at least of said connecting section being reduced in cross sectional area to render the same resilient and thereby facilitate the outward flexing of said threaded sections to render the same self-locking.

6. A self-locking screw including a screw body having a transverse slot to present oppositely disposed threaded sections, the portion of the stock surrounding the bottom of the slot presenting a connection for said threaded sections, a portion at least of said connecting section being symmetrically reduced in cross sectional area on opposite sides to render the same resilient and thereby facilitate the outward flexing of said threaded sections to render the same self-locking.

7. A self-locking set screw including a pair of oppositely disposed screw sections separated by a transverse slot having a width which is equal to substantially one-third of the diameter of the screw, and a resilient connecting section extending between said screw sections, said screw sections being deflected laterally so as to render said sections self-locking when applied to the threaded aperture of a work piece.

8. A self-locking screw including a screw body which is bifurcated at each end thereof and provided with an intermediate section which forms the connecting section for the screw bifurcations, said connecting section being resilient so as to facilitate the outward flexing of said screw sections to render the same self-locking when applied to a work piece.

CARL G. OLSON.